United States Patent
Ingels et al.

(10) Patent No.: US 8,707,084 B2
(45) Date of Patent: Apr. 22, 2014

(54) DATA CENTER MANAGEMENT UNIT WITH PROTECTION AGAINST NETWORK ISOLATION

(75) Inventors: Wilbert Ingels, Ternat (BE); Niko Vinken, Anzegem (BE)

(73) Assignee: Racktivity NV, Lochristi (BE)

( * ) Notice: Subject to any disclaimer, the term of this patent is extended or adjusted under 35 U.S.C. 154(b) by 293 days.

(21) Appl. No.: 13/063,394

(22) PCT Filed: Aug. 12, 2010

(86) PCT No.: PCT/EP2010/004938
§ 371 (c)(1),
(2), (4) Date: Mar. 10, 2011

(87) PCT Pub. No.: WO2011/066876
PCT Pub. Date: Jun. 9, 2011

(65) Prior Publication Data
US 2011/0197082 A1   Aug. 11, 2011

(30) Foreign Application Priority Data
Dec. 3, 2009  (EP) .................................... 09075538

(51) Int. Cl.
G06F 11/00   (2006.01)
(52) U.S. Cl.
USPC ............... 714/4.1; 714/4.11; 714/14; 714/22; 714/41
(58) Field of Classification Search
USPC ................................ 714/4.1, 4.11, 14, 22, 41
See application file for complete search history.

(56) References Cited

U.S. PATENT DOCUMENTS

| 6,028,984 | A  | * | 2/2000  | Kimball ........................ 709/249 |
| 7,171,461 | B2 | * | 1/2007  | Ewing et al. .................. 709/223 |
| 7,366,120 | B2 | * | 4/2008  | Handforth et al. ............ 370/310 |
| 7,688,715 | B2 | * | 3/2010  | Lee et al. ....................... 370/218 |
| 8,238,238 | B2 | * | 8/2012  | Baron et al. ................... 370/230 |
| 2004/0047095 | A1 |  | 3/2004 | Reynolds |
| 2005/0223090 | A1 | * | 10/2005 | Ewing et al. .................. 709/223 |
| 2006/0259538 | A1 | * | 11/2006 | Ewing et al. .................. 709/200 |
| 2007/0140238 | A1 | * | 6/2007  | Ewing et al. .................. 370/389 |
| 2008/0112422 | A1 | * | 5/2008  | Jetcheva et al. ............... 370/406 |
| 2008/0244281 | A1 | * | 10/2008 | Felter et al. ................... 713/300 |
| 2011/0245988 | A1 | * | 10/2011 | Ingels et al. .................. 700/295 |

FOREIGN PATENT DOCUMENTS

| EP | 09075538 A1  | 6/2011  |
| WO | 2006059195 A1 | 6/2006 |
| WO | 2009123741 A1 | 10/2009 |

OTHER PUBLICATIONS

International Search Report dated Nov. 19, 2010.

* cited by examiner

Primary Examiner — Charles Ehne
(74) Attorney, Agent, or Firm — Symbus Law Group LLC; Clifford D. Hyra

(57) ABSTRACT

A data center management unit (DCMU, 100) for managing and controlling power distribution to computers in a data center, includes a power inlet (101), a plurality of power outlets (111, 112, 113, 114, 115, 116, 117, 118) for providing power to respective ones of the computers, a processor (141), at least one wired data port (151, 152, 153, 154) for controlling one or more of the computers, and a network interface (155) enabling a data center administrator to manage the data center management unit (DCMU, 100) remotely via wired network connectivity. In addition the data center management unit (DCMU, 100) contains a redundant meshed wireless network interface (156). The data center management unit (DCMU, 100) is adapted to automatically switch to the redundant meshed wireless network interface as an alternative for the network interface (155) in situations where the wired network connectivity is lost.

3 Claims, 3 Drawing Sheets

DATA CENTER MANAGEMENT UNIT WITH PROTECTION AGAINST NETWORK ISOLATION

Reference is made to European patent application 09075538.0 of which priority is claimed, and which is hereby incorporated by reference in its entirety.

FIELD OF THE INVENTION

The present invention generally relates to power management in data centers and server installations. In particular, the present invention concerns a data center management unit (DCMU) or smart power distribution unit (PDU) with improved protection against network isolation.

BACKGROUND OF THE INVENTION

Data centers represent hosting facilities that typically host a few tens up to thousands of computers, e.g. servers, routers, switches, etc., organized in racks or cabinets. Power has become one of the most difficult and expensive items to manage in such data centers. Up to 40% of data center power supplies are not working optimally. These power supplies consume excessive power resulting in heating, malfunctioning devices, and finally occasional or regular power shutdowns. Networks are out of control after a power failure in the data center and often customers are aware of the data center problem before the data center's operator. In 50% of the cases, the data center operator is informed by the customer on a power shutdown that has occurred in the data center. The data center operator however may have difficulties to remote control the switches, airco's, or other electronic devices in the data center when the network is out of control or even down. Indeed, as a result of for instance a human error or a Denial of Service (DoS) attack, network access may be lost as a consequence of which the data center operator is locked out and remote access to the PDU has become impossible.

As opposed to a dumb power distribution unit (PDU) that has no instrumentation and is not manageable, the present invention concerns a smart power distribution unit or data center management unit (DCMU) that can be metered, is equipped with one or more displays, and can be switched, i.e. individual outlets can be switched on or off remotely. Smart PDUs typically feature serial data ports such as RS232 ports or USB (Universal Serial Bus) ports for controlling hardware in the data room like for example servers, switches, routers, etc. In addition, smart PDUs typically have a port for network connectivity such as an RJ45 interface for Ethernet connectivity. This way, the data center administrator is enabled to access the smart PDU from a remote terminal or PC with network connectivity in order to turn on/off certain outlets, to schedule power shutdowns, to control the load, etc.

US Patent Application 2004/047095 entitled "Method and/or System and/or Apparatus for Multiple Interface Remotely Configurable Power Supply" from Cyber Switching, Inc., for instance discloses a PDU (FIG. 24 in US 2004/0047095) with power inlet (AC Inlet), plurality of power outlets (AC Outlets), a processor (Rabbit2000 Microcontroller), wired data ports (RJ45 Serial Jack) and a network interface (RJ45 Ethernet Jack) enabling remote access to the PDU (par. [0048]-[0049]).

When, as a result of for instance overload, a human error or a Denial of Service (DoS) attack, the network connectivity is lost, the smart PDU is no longer remotely accessible and a technician must be dispatched to intervene on-site and troubleshoot the network environment. The data center may be unmanageable for some time and customers may be left without service until the technician has travelled to the data center and restored the network connectivity.

In summary, although existing smart PDUs are equipped with a network interface such as an Ethernet interface (e.g. an RJ45 connector), they are not well-protected against network isolation, i.e. situations where the network connectivity is disrupted as a result of a human error, DoS attack, or the like.

It is an objective of the present invention to disclose a smart PDU or data center management unit (DCMU) that overcomes the above identified shortcomings of existing PDUs. In particular, it is an objective of the present invention to disclose a DCMU with improved protection against network isolation resulting from human errors, DoS attacks and the like, and with guaranteed ability to manage the data center remotely even if the usual network connection is down.

SUMMARY OF THE INVENTION

According to the present invention, the above identified shortcomings of the prior art are resolved through a data center management unit (DCMU), comprising a power inlet, a plurality of power outlets for providing power to respective ones of the computers, a processor, at least one wired data port for controlling one or more of the computers, a network interface enabling a data center administrator to manage the data center management unit remotely via wired network connectivity, and a redundant meshed wireless network interface, the data center management unit being adapted to automatically switch to the redundant meshed wireless network interface as an alternative for the network interface in situations where the wired network connectivity is lost.

Indeed, the meshed wireless network interface in the DCMU according to the present invention provides access to a secondary, redundant network, that enables to always control and troubleshoot the DCMU's environment remotely, even if the usual network connection is down or overloaded. Via the meshed wireless network interface, access to a parallel redundant network is provided that can help the data center operator identify and resolve the cause of the network isolation. Moreover, the DCMU according to the present invention provides a solution in case network connectivity is lost as a result of a DoS attack. When as a consequence of a DoS attack the network is down, the DCMU according to the present invention will automatically switch to its meshed wireless network interface and guarantee full access to any serial port device like routers, switches, etc. This way, the data center operator can still turn off certain ports on routers or switches in order to resolve the DoS attack.

In case a number of DCMU's lose network connectivity, e.g. a situation where 49 out of 50 DCMU's lose their network connectivity, it remains possible to manage the 49 DCMU's via the remaining DCMU with network connectivity and the meshed wireless network. The DCMU with network connectivity will in such situation operate as gateway between wired Ethernet and meshed wireless networks.

Optionally, the redundant meshed wireless network interface is a ZigBee interface.

Further optionally, the wired data port may comprise one or more of the following:
 a Recommended Standard 232 or RS232 interface;
 an Intelligent Platform Management Interface or IPMI interface;
 a Universal Serial Bus or USB interface;
 an Inter-Integrated Circuit or I²C interface; and
 a Serial Peripheral Interface or SPI interface.

According to another optional aspect, the data center management unit according to the present invention may comprise an integrated Ethernet switch.

This way, the powering and networking will be managed from a single central management station that is no longer dependent on for instance RS232 connectivity.

DETAILED DESCRIPTION OF EMBODIMENT(S)

Figure 1:
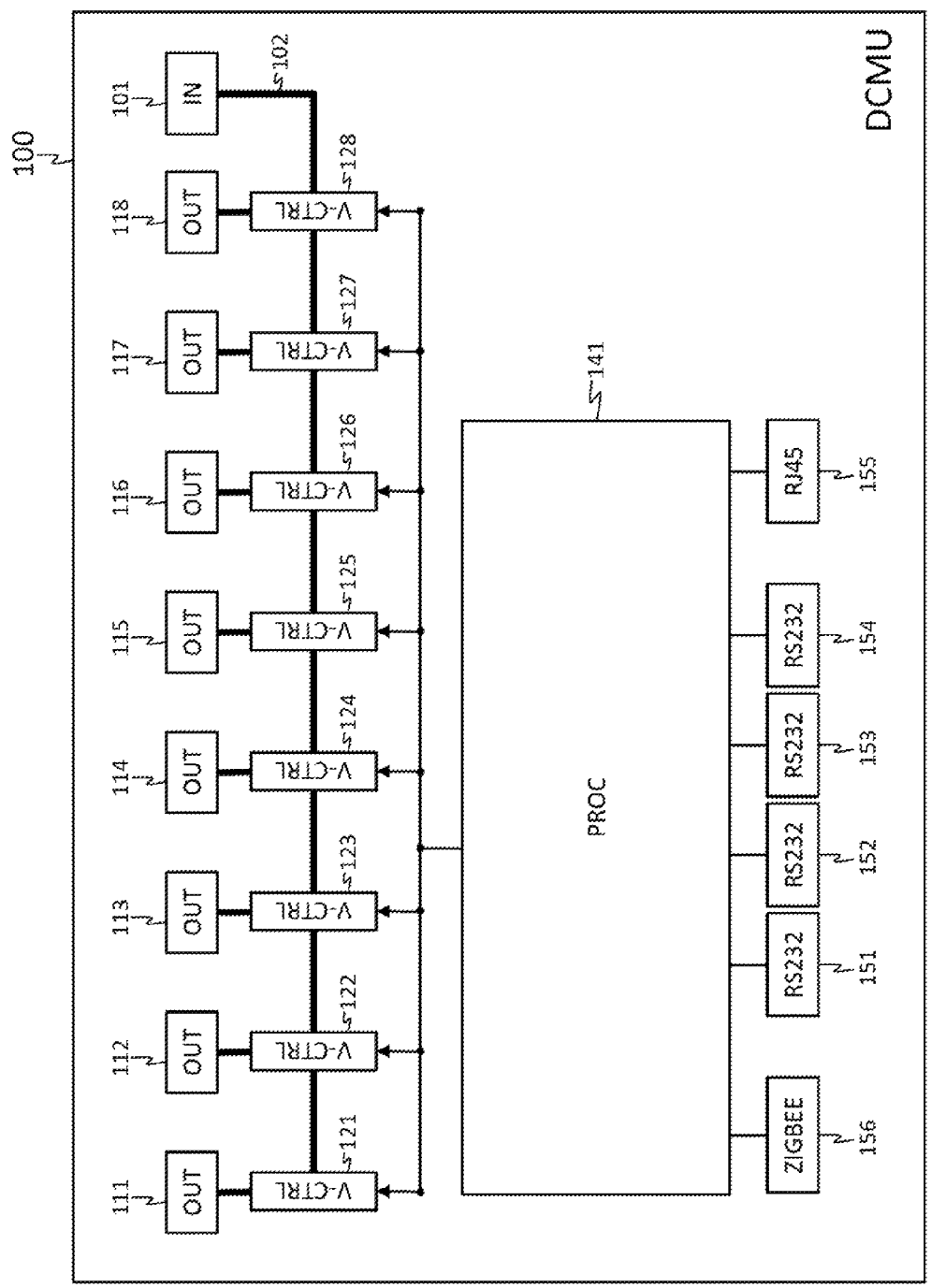
FIG. 1 is a functional block scheme of a first embodiment of the data center management unit (DCMU) according to the present invention.

FIG. 1 shows a data center management unit, DCMU or 100. The DCMU has a single power inlet, IN or 101, eight power outlets, OUT or 111, 112, 113, 114, 115, 116, 117 and 118, a processor, PROC or 141, four RS232 ports, 151, 152, 153, 154, an RJ45 connector 155, and a meshed wireless network interface, ZIGBEE or 156. The RS232 ports 151, 152, 153, 154, the RJ45 connector 155 and the meshed wireless network interface 156 are connected to the processor 141. Each of the power outlets 111, 112, 113, 114, 115, 116, 117 and 118 is equipped with a voltage controller, respectively denoted by V-CTRL or 121, 122, 123, 124, 125, 126, 127 and 128. These voltage controllers 121, 122, 123, 124, 125, 126, 127 and 128 each have an input connected to a control output of the processor 141. The power distribution wiring 102, represented by a bold, black line in FIG. 1, couples the power outlets 111, 112, 113, 114, 115, 116, 117 and 118 to the power inlet 101 via the respective voltage controllers 121, 122, 123, 124, 125, 126, 127 and 128.

The DCMU 100 drawn in FIG. 1 can distribute power to at most eight connected devices. The power inlets of these eight devices, e.g. servers in a rack of a data center, thereto are connected to the power outlets 111, 112, 113, 114, 115, 116, 117 and 118 of the DCMU 100. By controlling the open/closed state of the voltage controllers 121, 122, 123, 124, 125, 126, 127 and 128, the processor 141 controls the distribution of power to the servers connected to the outlets 111, 112, 113, 114, 115, 116, 117 and 118. When for instance the voltage controller 121 is opened, the power outlet 111 is switched off and the server connected to power outlet 111 is de-activated. When the voltage controller 121 is closed, the power outlet 111 is switched on and the server connected to the power outlet 111 is activated.

Figure 2:
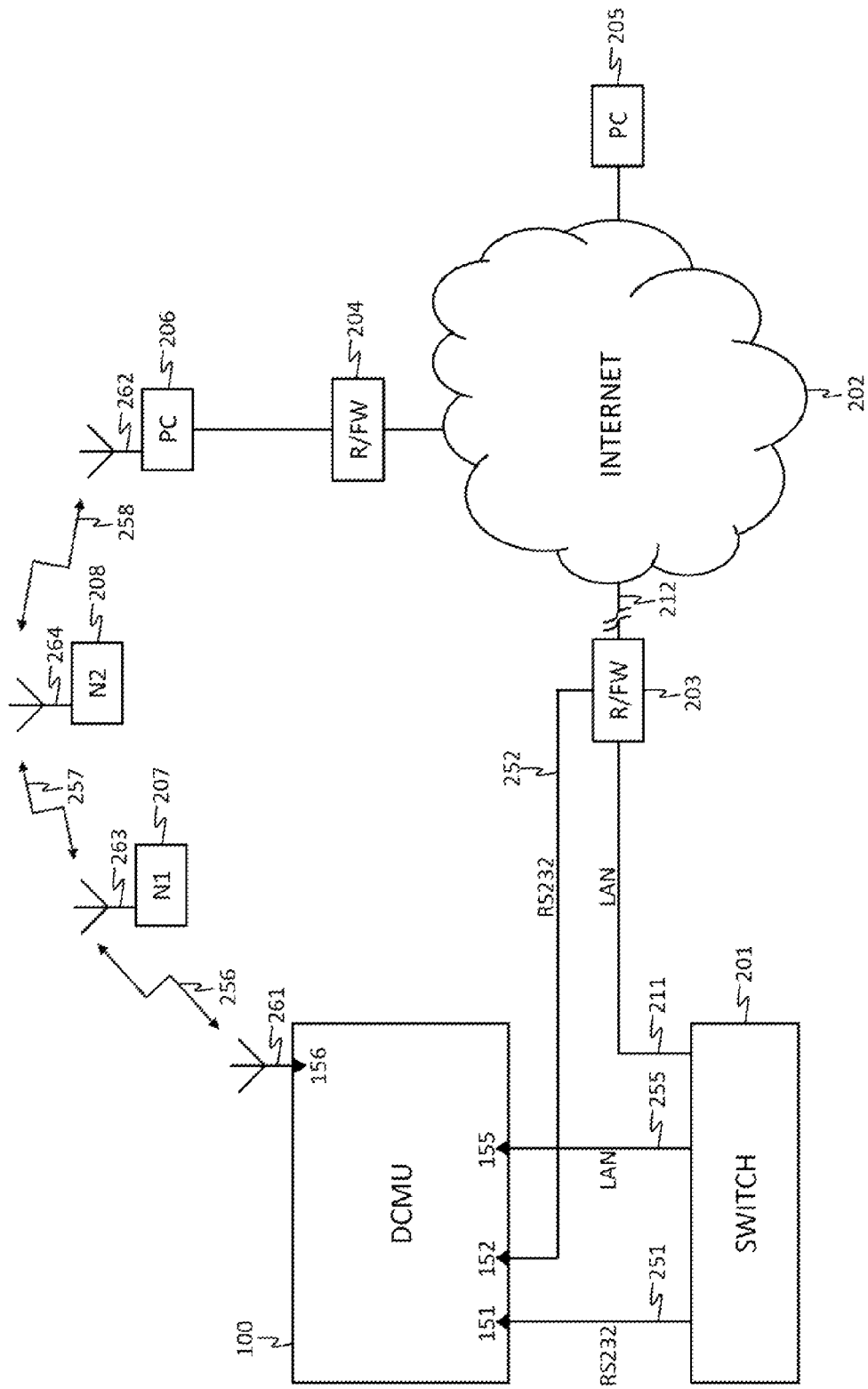
FIG. 2 illustrates a situation wherein the data center management unit (DCMU) of FIG. 1 has lost its usual network connectivity.

The DCMU 100 is remotely configurable and controllable via a network, e.g. the Internet. This is illustrated by FIG. 2 where the RJ45 connector 155 of DCMU 100 is connected via LAN wiring 255, switch 201, LAN wiring 211, router with integrated firewall R/FW or 203, and wiring 212 to the Internet 202. As a result, the data center operator can access the DCMU 100 from any PC 205 with Internet connectivity. Via remote management, certain power outlets of DCMU 100 can be switched on/off, rebooting servers connected to the power outlets of DCMU 100 can be scheduled, and certain ports connected to servers, routers, switches or certain ports on routers and switches can be turned off/on, like for instance ports on switch 201 via the RS232 connection 251 between RS232 port 151 of the DCMU 100 and an RS232 port of switch 201, or ports on the router/firewall 203 via RS232 connection 252 between RS232 port 152 of DCMU 100 and an RS232 port of router/firewall 203. Thus, network connectivity for DCMU 100 is realized through the RJ45 Ethernet connector 155. Typically, this RJ45 connector will be connected via one or more switches, firewalls and/or routers to the Internet or an Intranet, and enable the data center operator to remotely manage and control the power distribution from a PC with network connectivity like 205 in FIG. 2. The DCMU 100 further features four RS232 serial data ports 151, 152, 153 and 154 for connectivity with the computers, servers, routers, etc. in the data center. These serial ports can be used to directly control various hardware functions, like switching on/off power ports, data ports, etc.

As a result of a Denial of Service (DoS) attack or a human error where the network manager locked himself out, the network connectivity between DCMU 100 and the Internet 202 might be disrupted. In FIG. 2, it is supposed that the connection 212 between the router/firewall 203 and the Internet 202 is broken. As opposed to state-of-the-art PDU's, the DCMU 100 however remains fully operational and remotely controllable via its wireless mesh network interface 156 with antenna 261. Indeed, when the ZigBee interface 156 can establish connectivity over the wireless mesh network with a PC 206 that has on the one hand a ZigBee interface with antenna 262 and that is on the other hand connected with the data center operator's PC 205, e.g. via one or more routers and/or firewalls 204 and the Internet 202, the data center operator will have remote access to the DCMU 100 and can instruct to activate/de-activate ports on the router/firewall 203 such that the regular network connectivity via interface 155 is restored. In FIG. 2, the connection between the DCMU's ZigBee antenna 261 and the ZigBee antenna 262 of PC 206 with Internet connectivity is established via a wireless connection 256 between antenna 261 and the ZigBee antenna 263 of a first intermediate node, N1 or 207, a wireless connection 257 between the ZigBee antenna 263 of this first intermediate node 207 and the ZigBee antenna 264 of a second intermediate node, N2 or 208, and a wireless connection 258 between the ZigBee antenna 264 of the second intermediate node 208 and the ZigBee antenna 262 of PC 206. Thanks to the wireless mesh network interface 156, the DCMU 100 has a redundant network interface with extensive reach in case the wired network connection is interrupted. The ZigBee interface 156 in other words provides full redundancy for the wired network connectivity and avoids that a technician must be dispatched to the data center to restore network connectivity after lengthy service interruptions for end users. The term "redundancy" in the current patent application indicates that the wireless interface of the DCMU provides an alternative for the wired network interface of the DCMU for situations where the wired network connectivity is lost. It does not refer to the inherent redundant nature of meshed network enabling the meshed wireless network to establish an alternative wireless path in case one or more wireless links drop.

Thus, when as a consequence of a DoS attack, the network connectivity is down, the DCMU 100 according to the present invention will automatically switch to its meshed wireless network interface 156 and allow the system operator full control and access to any serial port device like routers (e.g. 203) and switches (e.g. 202). This way, certain ports on routers, switches, etc. can be turned on/off to resolve the DoS attack and restore the network connectivity via the regular network interface.

Figure 3:
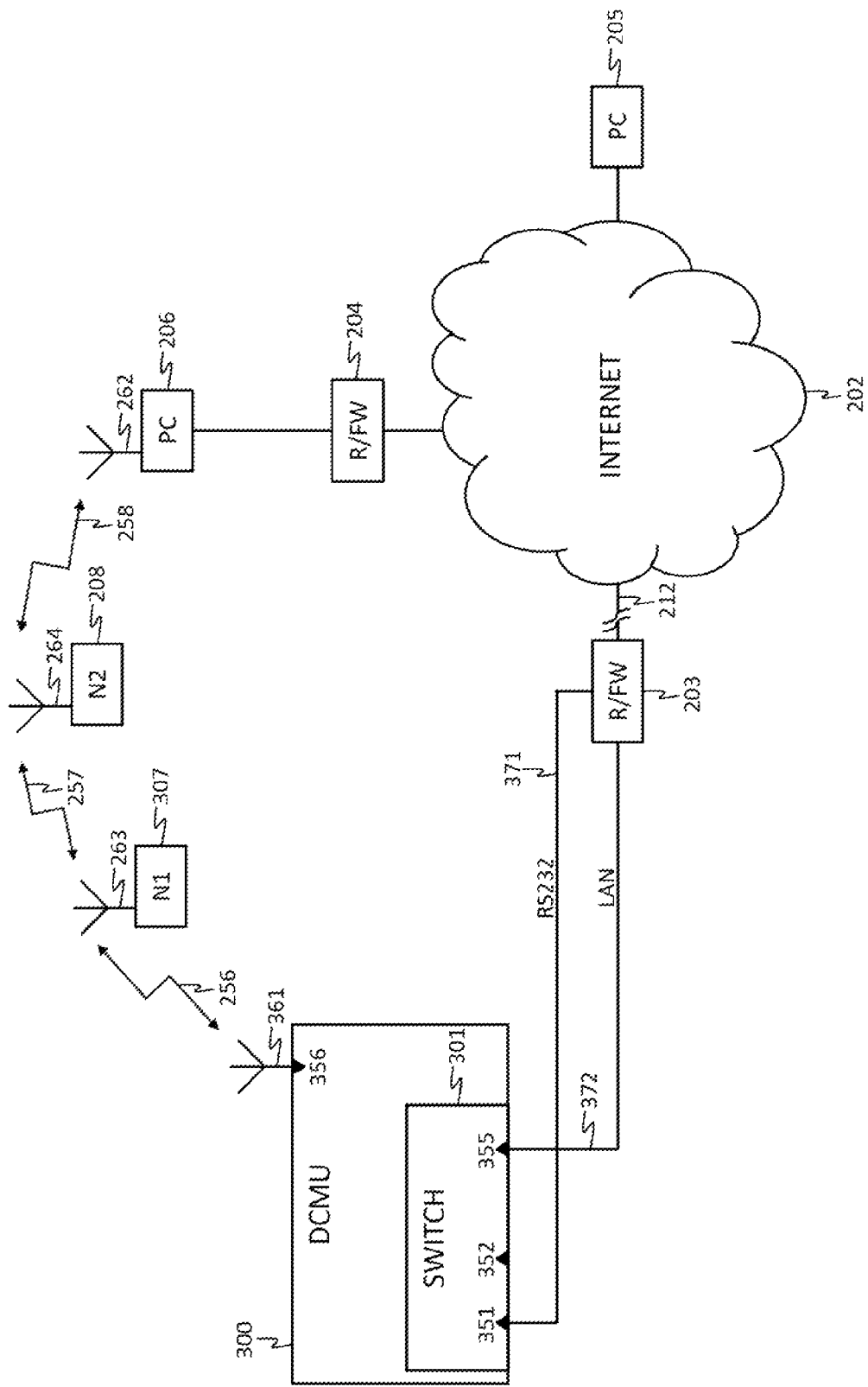
FIG. 3 illustrates the situation of FIG. 2 with a second embodiment of the data center management unit (DCMU) according to the present invention.

FIG. 3 shows a variant embodiment 300 of the DCMU according to the invention, with integrated Ethernet switch 301. The network environment of DCMU 300 is supposed to be equal to the network environment of DCMU 100 in FIG. 2. As a consequence, the same references are used in FIG. 3 and FIG. 2 for the network environment. The RJ45 connector 355 of DCMU 300 is connected via LAN wiring 372, router with integrated firewall 203 and wiring 212 to the Internet 202. As a result, the data center operator can access DCMU 300 from any PC 205 with Internet connectivity. In comparison with the DCMU 100 of FIG. 2, DCMU 300 is advantageous in that it has an integrated Ethernet switch 301 as a result of which the power management and network management become integrated in a single central management device that no longer depends on RS232 connections or the like towards external switches. The DCMU 300 however still features a number of RS232 ports like 351 and 352, one of which is for instance used to control the router/firewall 203 via RS232 connection 371.

As a result of a Denial of Service (DoS) attack or a human error where the network manager locked himself out, the network connectivity between DCMU 300 and the Internet 202 might be disrupted. Just like in FIG. 2, it is supposed in FIG. 3 that the connection 212 between the router/firewall 203 and the Internet 202 is broken. The DCMU 300 however remains fully operational and remotely controllable via its wireless mesh network interface 356 with antenna 361. Indeed, when the ZigBee interface 356 can establish connectivity over the wireless mesh network with a PC 206 that has on the one hand a ZigBee interface with antenna 262 and that is on the other hand connected with the data center operator's PC 205, e.g. via one or more routers and/or firewalls 204 and the Internet 202, the data center operator will have remote access to the DCMU 300 and can instruct to activate/deactivate ports on the router/firewall 203 such that the regular network connectivity via interface 355 is restored. In FIG. 3, the connection between the DCMU's ZigBee antenna 361 and the ZigBee antenna 262 of PC 206 with Internet connectivity is established via a wireless connection 256 between antenna 361 and the ZigBee antenna 263 of a first intermediate node, N1 or 207, a wireless connection 257 between the ZigBee antenna 263 of this first intermediate node 207 and the ZigBee antenna 264 of a second intermediate node, N2 or 208, and a wireless connection 258 between the ZigBee antenna 264 of the second intermediate node 208 and the Zig Bee antenna 262 of PC 206. Thanks to the wireless mesh network interface 356, the DCMU 300 has a redundant network interface with extensive reach in case the wired network connection is interrupted. The ZigBee interface 356 in other words provides full redundancy and avoids that a technician must be dispatched to the data center to restore network connectivity after lengthy service interruptions for end users.

Although the present invention has been illustrated by reference to a specific embodiment, it will be apparent to those skilled in the art that the invention is not limited to the details of the foregoing illustrative embodiment, and that the present invention may be embodied with various changes and modifications without departing from the scope thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. In particular, it will be appreciated by the skilled technician that the ZigBee interface in the above illustrated embodiment could be replaced with any variant wireless mesh network interface.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A data center management unit for managing and controlling power distribution to computers in a data center, said data center management unit comprising a power inlet, a plurality of power outlets for providing power to respective ones of said computers, a processor, at least one wired data port for controlling one or more of said computers, and a network interface enabling a data center administrator to manage said data center management unit remotely via wired network connectivity, wherein said data center management unit further comprises a redundant meshed wireless network interface, said data center management unit being adapted to automatically switch to said redundant meshed wireless network interface as an alternative for said network interface in situations where said wired network connectivity is lost.

2. A data center management unit according to claim 1, wherein said at least one wired data port comprise one or more of the following:
a Recommended Standard 232 or RS232 interface;
an Intelligent Platform Management Interface or IPMI interface;
a Universal Serial Bus or USB interface;
an Inter-Integrated Circuit or I²C interface; and
a Serial Peripheral Interface or SPI interface.

3. A data center management unit according to claim 1, said data center management unit further comprising an integrated Ethernet switch.

\* \* \* \* \*